United States Patent [19]

Sanner et al.

[11] Patent Number: 4,789,713

[45] Date of Patent: Dec. 6, 1988

[54] PREPARATION OF TERPOLYMERS

[75] Inventors: Axel Sanner, Frankenthal; Friedrich Vogel, Machenheim, both of Fed. Rep. of Germany

[73] Assignee: BASF Aktiengesellschaft, Rheinland-Pfalz, Fed. Rep. of Germany

[21] Appl. No.: 91,847

[22] Filed: Sep. 1, 1987

[30] Foreign Application Priority Data

Sep. 12, 1986 [DE] Fed. Rep. of Germany ....... 3631070

[51] Int. Cl.$^4$ .................................................. C08F 2/00
[52] U.S. Cl. ....................................... 526/81; 526/201; 526/202; 526/211; 526/214; 526/218.1; 526/224; 526/227; 526/307.6; 528/500
[58] Field of Search ..................... 528/500; 526/307.6, 526/81, 201, 202, 211, 214, 218.1, 224, 227

[56] References Cited

U.S. PATENT DOCUMENTS 3,658,772 4/1972 Volk et al. ........................ 526/307.6
3,969,329 7/1976 Hirata et al. ..................... 526/307.6
4,267,103 5/1981 Cohen ............................... 526/307.6

FOREIGN PATENT DOCUMENTS 0037378 10/1981 European Pat. Off. .

Primary Examiner—Joseph L. Schofer
Assistant Examiner—J. M. Reddick
Attorney, Agent, or Firm—Oblon, Fisher, Spivak, McClelland & Maier

[57] ABSTRACT

A terpolymer of acrylic acid, ethyl acrylate and N-tert-butylacrylamide is prepared by suspension polymerization.

16 Claims, No Drawings

PREPARATION OF TERPOLYMERS

BACKGROUND OF THE INVENTION

Field of the Invention

The present invention relates to a process for the preparation of a terpolymer of acrylic acid, ethyl acrylate and N-tert-butylacrylamide by suspension polymerization.

DISCUSSION OF THE BACKGROUND

EP-No. B1-37 378 describes a solution polymerization for the preparation of a polymer of acrylic acid, ethyl acrylate and N-tert-butylacrylamide, to be used as a hair-setting composition. In this polymerization method, satisfactory polymerization in terms of solubility and hair-setting action of the polymers can be achieved only by carrying out special measures, such as maintaining certain feed ratios for the solution, the monomer mixture and the solution of the free radical polymerization initiator.

It may not be possible for the alcoholic or aqueous-alcoholic solution of this terpolymer obtained in the preparation to be used directly for cosmetic purposes because the solution contains odor-producing and toxic substances, such as unconverted monomers and reaction products of initiator radicals with solvents and/or monomers, which cannot easily be completely removed.

For example, they cannot be completely removed by simply distilling off the alcohol used as the solvent. Moreover, when the solvent is simply distilled off, the polymer remains behind as a non-pourable solid which is difficult to handle. Attempts to obtain a free-flowing powder by spray drying were unsuccessful. Since the terpolymer referred to above is water-insoluble, purification by steam distillation is very difficult to carry out. For these reasons, it is relatively difficult to obtain a pure terpolymer, either in solution or as a free-flowing powder.

SUMMARY OF THE INVENTION

It is an object of the present invention to provide a process for the preparation of a terpolymer of acrylic acid, ethyl acrylate and N-tert-butylacrylamide, in which the end product is obtained directly in a free-flowing and odorless form which is easy to handle.

We have found that this object is achieved by a process for the preparation of a terpolymer of from 50 to 56% by weight of N-tert-butylacrylamide, from 37 to 45% by weight of ethyl acrylate and from 6 to 9% by weight of acrylic acid, the percentages being based on the weight of the monomers, wherein a suspension polymerization is carried out in which (a) the monomers are introduced individually or as a mixture, with stirring, into water which contains from 0.05 to 1.5% by weight of a protective colloid and from 0.1 to 1.0% by weight of a regulator, the percentages being based on the total weight of the monomers, so that a 25–50% strength by weight mixture is formed, (b) the resulting, stirred mixture is heated to 60°–80° C. and stirred at this temperature for from 15 minutes to 1 hour until a homogeneous emulsion has formed, (c) the amount of initiator, ie. from 0.1 to 1.0% by weight, based on the total weight of the monomers, is then metered in the course of from 1 to 9 hours in such a way that a polymerization temperature of from 70° to 100° C. is maintained, and (d) after the subsequent complete polymerization, the resulting terpolymer having a molecular weight of from 20,000 to 80,000, determined by light scattering, is filtered off, washed with water and dried.

DETAILED DESCRIPTION OF THE PREFERRED EMBODIMENTS

If necessary, an intermediate steam distillation is carried out in a conventional manner after the complete polymerization at 100° C. Advantageously, steam at about 100° C. or superheated steam is blown through until about 0.5 times to twice the amount of water present has been exchanged.

The surprising effect of the novel process is that a suspension polymerization which is simple to carry out gives a solid, substantially dust-free, free-flowing and odorless terpolymer which completely fulfills the required performance characteristics.

It was not directly to be expected that it would be possible to carry out a suspension polymerization without difficulties with water-insoluble ethyl acrylate, water-soluble acrylic acid and N-tert-butylacrylamide, which is solid as such and virtually insoluble in water (0.7% by weight at 25° C.).

It is noteworthy that the core of the novel process is the combination of a relatively small amount of a molecular weight regulator and relatively small amounts of initiators. Only in this way is it possible to obtain the desired molecular weight range of from 20,000 to 80,000 for the very reactive monomers, which would otherwise polymerize immediately to give high molecular weights.

In specific terms, the novel process may be described as follows.

The terpolymer is preferably composed of from 50 to 53% by weight of N-tert-butylacrylamide, from 40 to 42% by weight of ethyl acrylate and from 7 to 9% by weight of acrylic acid.

To prepare the aqueous monomer emulsion, N-tert-butylacrylamide is advantageously introduced in the solid form with stirring, while the liquid monomers ethyl acrylate and acrylic acid can be added as a mixture with one another or individually.

The amount of water initially taken contains a polymeric protective colloid, preferably from 0.1 to 0.5% by weight, based on the total weight of the monomers, and 0.1–1% by weight of a regulator.

The conventional protective colloids familiar to the skilled worker can be used. Polyvinyl alcohol having a molecular weight of from 200,000 to 1,000,000 or higher, polyvinylpyrrolidone having a molecular weight of from 30,000 to 1.5 million and polyacrylic acid having a molecular weight of from 200,000 to 1,000,000 are noteworthy.

As is usual in the case of suspension polymerizations, the mixture is heated to 60°–80° C. with vigorous stirring. During this procedure, the N-tert-butylacrylamide, which is present in the largest amount, melts and the mixture is converted to a homogeneous aqueous suspension.

The molecular weight regulator, if necessary in the form of a solution, is added to the initially taken amount of water or to the suspension of the monomers. Conventional mercapto compounds which are completely or partially soluble in water and contain a total of 2 to 6 carbon atoms have proven useful regulators, for example alkyl mercaptans, such as n-butyl mercaptan, mercaptoalcohols, such as 2-mercaptoethanol and 2-mercaptopropanol, and mercaptocarboxylic acids, such as thioglycolic acid and cysteine.

It may be mentioned that, in the present suspension polymerization, the molecular weight regulator is advantageously used in relatively small amounts of from 0.1 to 1.0, preferably from 0.2 to 0.5, % by weight, based on the total weight of the monomers.

Water-insoluble organic peroxides or azo compounds which do not give toxic decomposition products and have half lives of about 1 hour at from 70° to 120° C. are advantageously and preferably used as initiators which form free radicals for the present suspension polymerization.

Noteworthy initiators are peresters or diacyl peroxides, in particular tert-butyl per-2-ethylhexanoate, tert-butyl pivalate and dilauryl peroxide.

Maintaining a polymerization temperature of from 70° to 100° C. with the addiiion of the initiator presents no difficulties in practice. The initiators are added over a period of from 1 to 9, preferably from 4 to 7, hours, for example at half hour intervals in small amounts which increase with time.

Polymerization is then completed in the course of 1-6, preferably 2-4, hours.

It is advisable to carry out steam distillation.

After the mixture has been cooled, the product is filtered off, washed and dried.

The resulting terpolymers have molecular weights of from 20,000 to 80,000, determined by the light scattering method. They are obtained in the form of free-flowing beads having a mean diameter of from 0.2 to 1.5 mm. The terpolymer obtained can be used without difficulties as a hair-setting composition in the conventional formulations, as described in, for example, G. Nowak, Die kosmetische Praxis, Verlag für die chemische Industrie, Augsburg 1984, or European Patent Application No. 62,002.

EXAMPLE 1

51 parts by weight of N-tert-butylacrylamide, 42.2 parts by weight of ethyl acrylate and 7.3 parts by weight of acrylic acid were introduced in succession, while stirring at room temperature, into 250 parts by weight of water which contained 0.2 part by weight of polyacrylic acid having a molecular weight of 250,000 as a protective colloid and 0.3 part by weight of 2-mercaptoethanol as a regulator. The mixture obtained was heated to 70° C., while stirring, and kept at this temperature for 30 minutes, a homogeneous emulsion being formed.

Thereafter, 0.175 part by weight of tert-butyl per-2-ethylhexanoate was added in small amounts while maintaining the time and temperature variation shown in the Table.

| Time h | Amount parts by weight | °C. |
|---|---|---|
| 0 | 0.005 | 70 |
| 0.5 | 0.006 | 70 |
| 1.0 | 0.008 | 80 |
| 1.5 | 0.009 | 80 |
| 2.0 | 0.011 | 90 |
| 2.5 | 0.012 | 90 |
| 3.0 | 0.014 | 90 |
| 3.5 | 0.015 | 90 |
| 4.0 | 0.017 | 90 |
| 4.5 | 0.018 | 90 |
| 5.0 | 0.060 | 90 |

After the addition of the last portion of initiator, polymerization was completed in the course of a further 3.5 hours at 90° C.

Steam was then blown through at 100° C. until, in the course of 4 hours, about 300 parts by weight of water had distilled over, residual monomeric N-tert-butylacrylamide being completely removed.

The polymer suspension obtained was filtered and the product was washed with water in order to remove very fine undissolved particles and was dried in a stream of air at about 50° C., a free-flowing powder having mean particle sizes of 0.3–1.5 mm being obtained. The molecular weight was 35,000.

We claim:

1. A process for the preparation of a terpolymer of from 50 to 56% by weight of N-tert-butylacrylamide, from 37 to 45% by weight of ethyl acrylate and from 6 to 9% by weight of acrylic acid, the percentages being based on the weight of the monomers, wherein a suspension polymerization is carried out in which:
   (a) the monomers are introduced individually or as a mixture, with stirring, into water which contains from 0.05 to 1.5% by weight of a protective colloid and from 0.1 to 1.0% by weight of a regulator, the percentages being based on the total weight of the monomers, so that a 25 to 50% strength by weight mixture is formed;
   (b) the resulting stirred mixture is heated to 60° to 80° C. and stirred at this temperature for from 15 minutes to 1 hour until a homogeneous emulsion has formed;
   (c) the amount of initiator, based on the total weight of the monomers, is then metered in the course of from 1 to 9 hours in such a way that a polymerization temperature of from 70° to 100° C. is maintained; and
   (d) after the subsequent complete polymerization, the resulting terpolymer having a molecular weight of from 20,000 to 80,000 is filtered-off, washed with water and dried.

2. The process of claim 1 wherein, afer complete polymerization, steam distillation is carried out.

3. The process of claim 1, wherein the amount of initiator used is from 0.1 to 1.0% by weight based on the total weight of the monomers.

4. The process of claim 2, wherein steam at about 100° C. or superheated steam is blown through until about 0.5 times to twice the amount of water present has been exchanged.

5. The process of claim 1, wherein N-tert-butylacrylamide is introduced in the solid form with stirring, and ethylacrylate and acrylic acid are added as a mixture with one another or individually.

6. The process of claim 1, wherein said protective colloid is a polyvinylalcohol having a molecular weight of from 200,000 to 1,000,000, a polyvinylpyrrolidone having a molecular weight of from 30,000 to 1.5 million, or a polyacrylic acid having a molecular weight of from 200,000 to 1,000,00.

7. The process of claim 1, wherein said regulator is an alkyl mercaptan, a mercaptoalcohol or a mercaptocarboxylic acid.

8. The process of claim 1, wherein said regulator is N-butylmercaptan, 2-mercaptoethanol, 2-mercaptopropanol, thioglycolic acid or cysteine.

9. The process of claim 1, wherein said regulator is used in an amount of from 0.2 to 0.5% by weight.

10. The process of claim 1, wherein said initiator is a water-insoluble organic peroxide or azo compound.

11. The process of claim 1, wherein said initiator is tert-butyl per-2-ethylhexanoate, tert-butylpivalate or dilauryl peroxide.

12. The process of claim 1, wherein said initiator is metered in the course of from 4 to 7 hours.

13. The process of claim 1, wherein said initiator is metered in the course of from 1 to 9 hours at half hour intervals in small amounts which increase with time.

14. The process of claim 1, wherein said polymerization is completed in the course of 1 to 6 hours.

15. The process of claim 1, wherein said polymerization is completed in the course of from 2 to 4 hours.

16. The process of claim 1, wherein said terpolymer is obtained in the form of free-flowing beads having a mean diameter of from 0.2 to 1.5 mm.

* * * * *